Sept. 13, 1966  W. E. LERWILL ETAL  3,273,113
METHODS OF AND APPARATUS FOR MEASURING THE TRAVEL
TIMES OF VIBRATIONS IN THE EARTH'S CRUST
Filed May 7, 1962  4 Sheets-Sheet 1
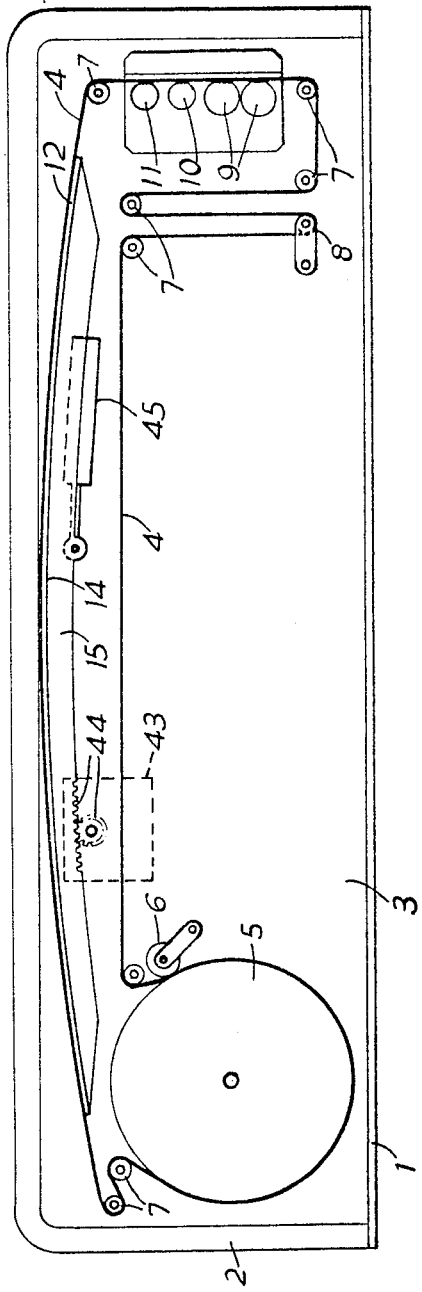
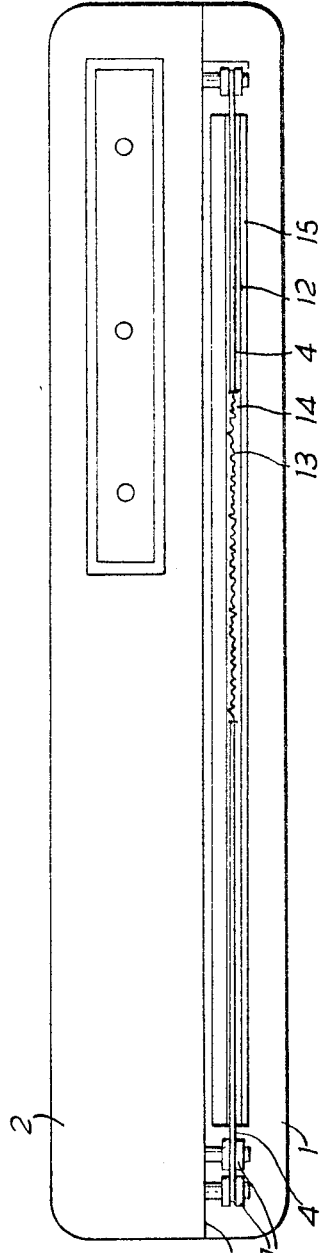
INVENTORS
NIGEL A. ANSTEY AND
WILLIAM E. LERWILL
Mason, Kolehmainen, Rathburn and Wyss
ATTORNEYS.

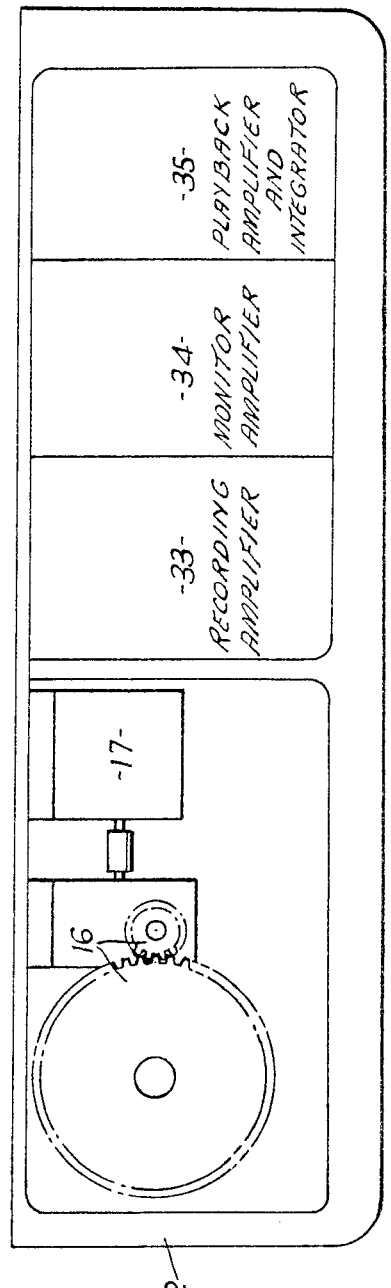
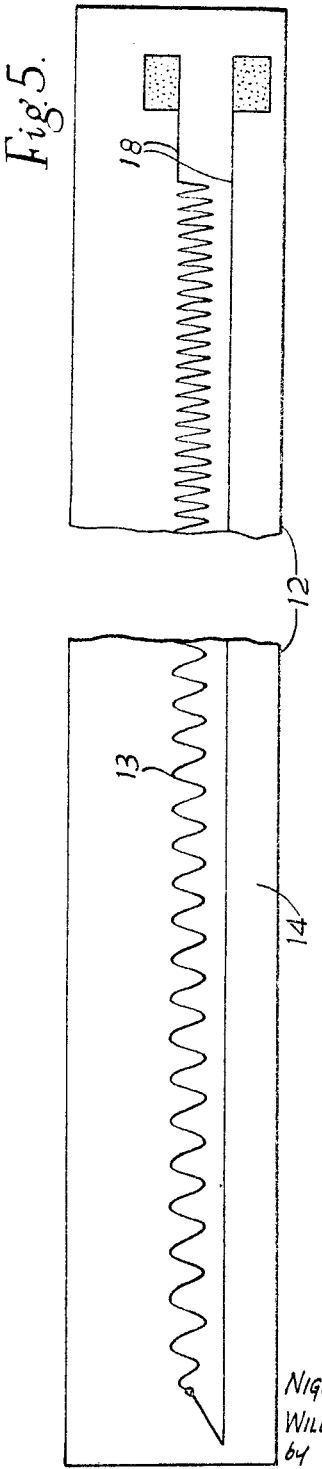

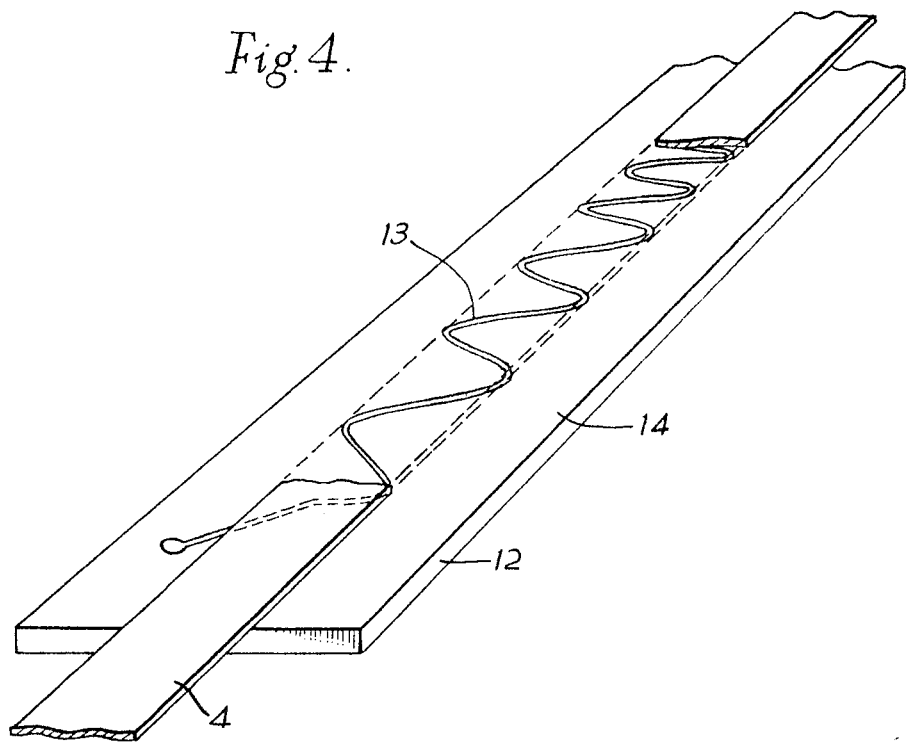

United States Patent Office 3,273,113
Patented Sept. 13, 1966

3,273,113
METHODS OF AND APPARATUS FOR MEASURING THE TRAVEL TIMES OF VIBRATIONS IN THE EARTH'S CRUST
William E. Lerwill, Keston, and Nigel A. Anstey, Chelsfield, England, assignors, by mesne assignments, to Continental Oil Company, Ponca City, Okla., a corporation of Delaware
Filed May 7, 1962, Ser. No. 192,669
Claims priority, application Great Britain, May 8, 1961, 16,687/61
6 Claims. (Cl. 340—15.5)

This invention relates to methods of and apparatus for measuring travel times between spaced points and it is more particularly concerned with the measurement of the travel times of seismic or like vibrations in the earth's crust.

The invention is especially concerned with methods of an apparatus for use in the seismic exploration of the earth's crust which involve the injection into the earth of the function $g(t)$ in the form of elastic waves, and the reception of the consequent vibrations $r(t)$ at suitably spaced detecting points or geophone stations. It it also particularly, but not exclusively, concerned with the vibration type system of seismic exploration, which is described in the United States Patents, Nos. 2,688,124; 2,808,577; 2,874,795; 2,910,134, and 2,981,928.

In the vibration type system of seismic exploration, large vibrators on the surface of the earth transmit into the earth a known, accurately controlled swept frequency signal as an elastic wave. For example, a typical operation might employ a frequency of 20–80 c.p.s., sweeping over a period of several seconds, so that a unique, non-repetitive vibration is transmitted into the earth. This signal is reflected at each of the many acoustic interfaces and gradients in the body of the earth; the surface of the earth at some distance from the vibrator then moves in accordance with the superimposition of all these reflections. This movement is detected amplified and recorded in a manner which is very similar to that used in conventional (explosive) seismic exploration. The resulting records must then be cross correlated with the transmitted signal to obtain reflection records of the usual type.

The vibration technique, therefore, differs from the conventional pulse systems in which explosive charges or a weight drop are used to generate the elastic waves, firstly in the transmission of a swept frequency signal of a duration which is long compared to conventional seismic pulses, and secondly in the cross correlation of the received signal against the transmitted signal. The present invention is concerned with methods of and apparatus for performing the cross correlation.

The correlation may be effected by evaluation of the finite cross-correlation function $$\int_0^T r(t)g(t+\tau)dt$$

where $g(t)$ and $r(t)$ are the generated and received signals, respectively, and where $\tau$ represents small increments of time from zero to the greatest reflection time of interest, T.

One form of apparatus for evaluating this function by multiplication and integration for each of many values of $\tau$ is described briefly in the article "Continuous Signal Seismograph," by Crawford, Doty and Lee (published in "Geophysics" of February 1960), and more fully in some of the United States Patents referred to above. Similar correlators are also described by several authors; a fairly complete summary of these may be found in "Experimental Correlograms and Fourier Transforms" by N. F. Barber, published by Pergamon Press, 1961.

The same function may be evaluated as a continuous function of $\tau$ by optical means; an example of such a correlator is described in United States Patent No. 2,839,149.

Although both these prior types of correlator evaluate the cross correlation function satisfactorily, they both have marked practical or operational difficulties. The first is extremely slow in operation and it involves much expensive equipment. The second involves a photographic process and requires very great care in the making and positioning of the photographic films. Because of these features it has not been possible heretofore, when using these methods, to assess the results of the seismic exploration in the field; it has been necessary to install the correlating equipment in the base office, and this is also a disadvantage.

The present invention makes it possible largely to overcome these operational disadvantages with a system which is at the same time inexpensive and portable, so that it may also be used in the field.

The invention also provides improved apparatus for the correlation, filtering, time correction and display of signals used in continuous energy seismic exploration methds.

It is a great advantage of the invention that it provides methods of and apparatus for seismic correlation which do not require the production of photoghaphic films or records, with their attendant difficulties of handling and processing.

Furthermore the invention provides novel apparatus for the correlation of seismic traces with data obtained from the logging of bore holes, or with data representing synthetic, average or typical seismic reflection or refraction information.

According to the present invention a method is provided of identifying and measuring the travel time of a signal transmitted through the earth's crust, which method includes a combination of the steps of producing an elongated transducer head having a plurality of transducing elements which are distributed along it at differing distances according to a pattern which corresponds to a variation with time of the transmitted signal, producing along the said head an energy field having a pattern which corresponds to that of the signal received and obtaining from the transducer head an output which represents such correlation and which by identifying the time at which the pattern of the energy field along the head corresponds to that of the transducing elements of the head provides a measure of the travel time of the signal.

According to a modification of the above, an input corresponding to the signal received is supplied to the transducer head so that the energy field produced by the head has a pattern which corresponds to a correlation of the transmitted and received signals, while the output from which the travel time is determined is obtained from this energy field.

The invention further provides apparatus for use in the identification of and the measurement of the travel time of a signal, received by transmission through the earth's crust, wherein the apparatus includes an elongated magnetic reproducting head and means for passing a magnetic record medium past the said head longitudinally thereof, wherein the reproducing head includes a plurality of conducting elements which are arranged thransversely across it and which are spaced apart at distances which vary along the head in accordance with a function of the signal transmitted, such that when a part of the record medium on which the received signal has been recorded is passing the reproducing head, the magnetic flux emanating from the magnetic record coacts with the conducting elements of the reproducing head, such that an electrical output is produced which represents a correlation of a function of the signal as transmitted and of the signal as received.

The invention also includes a number of other and important features which will appear from the following description.

The invention will be more fully described as applied to seismic exploration using a modification of the vibration type system. The correlator, which represents a most important feature of the apparatus, makes use of the method of correlation which is described in the specification of our copending patent application, Serial No. 190,912.

Reference will be made to the accompanying drawings, in which:

FIGURE 1 is front elevational view showing a magnetic correlator;

FIGURE 2 is a plan view of the correlator shown in FIGURE 1;

FIGURE 3 is a rear view of the correlator of FIGURES 1 and 2;

FIGURE 4 is a detail perspective view, partly cutaway, showing the tape passing over a play-back head as used in the recorder of FIGURES 1 to 3;

FIGURE 5 is a broken-away plan view showing a correlator head which may be used in the correlator of FIGURES 1 to 3;

Figure 6:
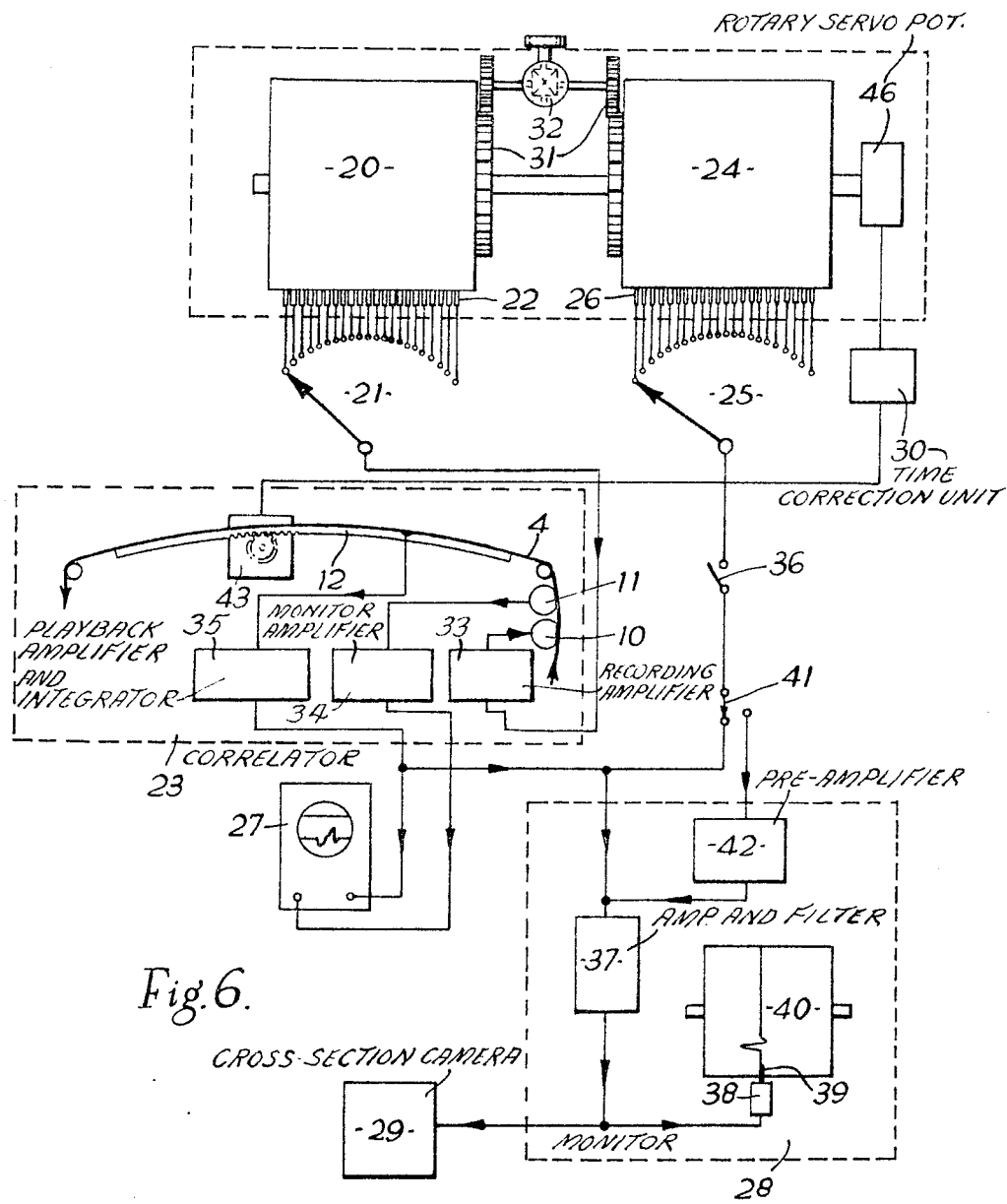
FIGURE 6 is a diagrammatic view showing a complete correlating apparatus which exemplifies the present invention.

Referring first to FIGURES 1 to 3, the correlator shown comprises a base 1 on which is mounted a casing 2 the front 3 of which carries the magnetic recording and play-back parts of the apparatus, particularly the recording and play-back heads and the means for guiding and driving the magnetic tape 4.

The tape 4 is in the form of an endless loop, which may be made of a conventional magnetic tape, typically ¼ inch in width. The tape 4 passes round a main driving drum 5 against which it is pressed by means of a spring-urged pinch roller 6. The tape also passes round a series of guide pulleys 7, under a spring urged tension pulley 8 and past a series of magnetic erase, recording and playback heads 9, 10, 11 and 12.

The heads 9 are high frequency erase heads, one or more of which may be used, and they cover the full width of the tap 4. The head 10 is the recording head which also covers the full width of the tape 4, while the head 11 is a conventional playback head which may be used to monitor the satifactory recording of the tape by the recording head 10.

After passing the recording head 10, on which the tape is recorded with the function r(t), and after passing the playback head 11 the tape is drawn over a head 12 which constitutes a correlating reproducing head, and will be referred to hereafter as the correlation head 12.

The head 12 (see also FIGURE 4) consists of a conducting line or strip 13 which is carried on an insulating base 14, which latter is fixed on a support 15 mounted on the front 3 of the casing 2. The support 15, to which the base 14 is secured by any suitable means, has a convexly curved upper surface, as shown in FIGURE 1, and the correlation head 12 is given a similar curvature. This ensures that the tape 4 is held in contact with the correlation head 12 by its own tension and renders unnecessary the use of pressure pads or other means for doing this.

The tape 4 is driven at an accurately controlled and uniform speed, which may typically be 3.75 inches per second, by the drum 5 which is itself driven through gearing 16 (FIGURE 3) by a synchronous electric motor 17, which latter may be energised from an inverter with associated frequency standard apparatus (not shown). It is important that the drive mechanism should be accurately made in order that the speed of the tape may be accurately controlled and free from fluctuations.

The conducting line 13 of the correlation head 12 is a plot of the function $g(t)$ at an amplitude scale which confines the maximum amplitude of the function within the magnetised width of the tape 4 and at a time scale which conforms exactly to the speed of the tape past the recording head 10. As is shown in our aforesaid application, Serial No. 190,912 the voltage output of the conducting strip 13 then represents the finite cross correlation of the first differential of the function $r(t)$ with the first differential of the function $g(t)$, and a signal representing the finite cross correlation of the functions themselves can be obtained by a double integration.

The control signal $g(t)$ which is used to drive the vibrators in a continuous energy seismic system is usually available as a reproducible signal. In this case the conducting strip 13 is preferably made by a printed circuit technique, using the following steps:

The reproducible signal is first replayed (by a magnetic or photoelectric or other reproducer) to a galvanometric or other suitable ocillograph, at a time scale which corresponds exactly to the tape speed used in the correlator (e.g. 3.75 inches per second) and with a maximum amplitude which is equal to or slightly less than the width of the correlator tape 4. Electrical connections are next drawn on the waveform and a negative photograph of it is made (for instance, by contact printing on a stable photographic material). Then this photograph is used as the master in a standard printed-circuit etching process, which leaves a fine copper line representing the function $g(t)$ supported on the base 14 which is made of a material of suitable stability (e.g. fiberglass).

FIGURE 5 illustrates a correlating head which has been made using the above method for a case when $g(t)$ is a swept frequency signal of seven seconds duration. The electrical connections to the strip 13 are here shown at 18.

The operation of replaying the original control signal to the oscillograph may be done in real time, or it may be convenient and advantageous to perform this operation at an increased or decreased speed. A decrease is appropriate, for instance, if the oscillograph response does not extend to the upper limit of frequency covered by the control signal. A change is also appropriate when the operation must be performed under conditions liable to interference from A.C. power installations. In a case where some A.-C. ripple pickup is likely to be encountered in the field recording, it is important not to have A.-C. ripple pickup on the correlating head. This may be avoided if the operation of replaying the control signal to the oscillograph is done with both reproducer and oscillograph running at the same nonstandard speed. Preferably, the reproducer drum and the oscillograph drum are mounted on a common shaft.

It is also possible to make printed circuit correlating heads by the manual or machine plotting of computed points; clearly this process becomes tedious unless the function $g(t)$ has a simple form, such as a rectangular or triangular wave. The disadvantage of using such functions other than quasi sinusoidal functions in continuous energy seismic exploration is that the process of cross correlation then yields "ghosts," in addition to the main cross correlation signal; these ghosts are associated with harmonic distortion in the signal, $r(t)$ or harmonic sensitivity in the correlating head representing $g(t)$. Our aforesaid appliction, Serial No. 190,912 describes a method whereby a correlating head of general rectangular type may be designed to have no sensitivity to the 2nd, 3rd, 4th, 6th, 8th, 9th, etc harmonics.

When the function $g(t)$ has a generally rectangular or triangular shape it is also possible to manufacture correlating heads by winding a former with fine wire. This is described also in our application, Serial No. 190,912. Such a head may then be mounted on the curved support member 15 in similar fashion to a printed circuit head.

It has been found that pressure pads are not necessary on the correlation head 12 when the latter is of curved form, as shown in FIGURE 1, and that the tape then rides over the head without any tendency to lateral movement provided that the guide pulleys 7 are suitably grooved. It is essential that these pulleys should have their shafts accurately oriented and provided with high quality bearings, while the gearing 16 must also be of very high quality. It has been found that wear of the tape 4 and of the colleration head 12 is very small and that if a plastic coated "sandwich" type of tape is used one loop of tape will last for many weeks without replacement.

For swept frequency signals of the type commonly used in vibration exploration, the voltage output from a correlating head is well suited to normal amplifying equipment. Furthermore, by virtue of the signal-to-random noise improvements which are obtainable by the correlation process, final signal-to-noise ratios of the complete instrumentation are very much better than those which are attainable with conventional direct magnetic recording.

Several other features of the magnetic correlation process described in our aforesaid application, Serial No. 190,912 can usefully be applied to the apparatus herein described for seismic correlation.

First, there is the method of achieving filtering (within the band of frequencies covered by the swept frequency signal) by lifting the tape away from the reproducing head over a part of the latter's length, or by inserting a magnetic shield between the tape and the reproducing head over a portion of the length of the head. This is most useful, in practice, for a quick assessment of the effect of particular degrees of filtering.

Second, a filter may be designed into a swept frequency correlating head by variations in the amplitude (and the phase, if desired) of particular sections of the head. This is extremely attractive for the elimination of power line pickup, which may be present on the field recordings; a smooth notch may be designed into the swept frequency head at a position centered on the power line frequency, and the elimination is accomplished without the 180° phase shift normally associated with notch filters.

Third, and as mentioned hereinbefore, two stages of integration are required if the output from the reproducing head is to represent the true cross-correlation of $r(t)$ and $g(t)$. Various possibilities for these are discussed in our aforesaid application, Serial No. 190,912, but for seismic purposes these two stages of integration are normally provided in the amplifier which follows the reproducing head. Sometimes, however, it may be found desirable to omit one (or even both) of these integrating stages, in order to compensate for the normal high frequency loss in the earth.

Fourth, when two stages of integration are used it becomes rather difficult to provide the necessary 180° phase lag at the lowest frequencies; our aforesaid application, Serial No. 190,912, describes a method of overcoming this by phase compensating the correlating head for the imperfections of the integrating amplifier. This principle may be extended to the phase-compensation of any or all other parts of the seismic apparatus, including the geophones, recording amplifiers and (in part at least) the vibrators. In this way it becomes feasible to ensure that the only phase present in the elementary waveforms constituting the final seismic record is that contributed by dispersion in the earth.

In the case of the geophones and recording amplifiers, for instance, this may be done very readily during the operation of replaying the control signal on to the oscillographic record used for making the printed circuit, for the field recording amplifier itself may be used to give the necessary amplification, and a geophone equivalent circuit may also be included before or after the amplifier. In this case, of course, the replay must be done in real time. The normal effect of the geophone and recording amplifier phase response causes the low frequencies in the function $r(t)$ to lead their true positions, and the high frequencies to lag. These effects are compensated if the correlating head, which represents $g(t)$, also exhibits the same behaviour.

A correlator in the form which has been described herein is well adapted to be used for the sequential processing of the several channels of seismic information normally employed. An assembly of equipment will now be described for the complete operation of sequential replay of the field data through the correlator to appropriate display apparatus.

As shown in FIGURE 6 of the drawings, this apparatus comprises a magnetic reproducer 20, step switch apparatus 21 for the sequential selection of the playback heads 22 of this reproducer, a correlator 23 which corresponds to that which has been described with reference to FIGURES 1 to 3, a magnetic recorder 24, step switch apparatus 25 for the sequential selection of the recording heads 26 of this recorder, a double-beam oscilloscope 27, a visual monitor 28, a cross-section camera 29, and a time correction unit 30.

According to one system which is used in vibration exploration, the recording cycle in the field occupies approximately thirteen seconds, of which about seven seconds represent the duration of the transmitted swept frequency signal. The reproducer 20 which plays back the field data is therefore adapted to have the same period of revolution as the field recorder (about thirteen seconds). After correlation, however, the useful data has a duration of approximately six seconds, and so the recorder 24 which records the correlated data is adapted to have a period of revolution which is exactly half that of the reproducer 20. This is accomplished by gearing 31 between the reproducing and recording drums, which gearing includes a differential 32. The assembly of the reproducing drum 20, recording drum 24, gearing 31, reproducing heads 22 and recording heads 26, together with the synchronous motor drive and control gear, may be made by modifying a Type 401 recorder-reproducer, which is a product of the Techno Instrument Company.

Each channel of the field data is selected in turn by the step switch 21, which is operated synchronously with the step switch 25 by a microswitch (not shown) on the reproducing drum 20. The raw seismic signal is then amplified in the recording amplifier 33 (also shown in FIGURE 3), mixed with the output of a conventional bias oscillator (not shown) and applied to the recording head 10 of correlator 23. The satisfactory operation of this part of the process is monitored by the conventional playback head 11, whose output is amplified by a monitor amplifier 34 and displayed on one trace of the two-beam oscilloscope 27. The correlated signal is derived from the novel correlation head 12 and is amplified in a playback amplifier 35, which amplifier incorporates the necessary integrating stages discussed above. The amplified and correlated signal is then displayed on the second trace of the two-beam oscilloscope 27, so that both correlated and uncorrelated signals may be monitored on this oscilloscope.

The correlated signal is also mixed with a bias signal and applied through a relay 36 and the step switch 25 to the appropriate one of the recording heads 26. The relay 36 is also operated from microswitches (not shown) on the drum 20, and is closed only during the second half of the 13-second cycle. There is thus an "active" and a "passive" revolution of the recorder drum 24 for each revolution of the reproducer drum 20.

The correlated signal is also applied to the input of an amplifier 37 in the visual monitor unit 28. This amplifier is fitted with the filtering, A.V.C. and suppression facilities which are commonplace in conventional seismic amplifiers. Its output is applied to an indexing stylus motor 38 operating a stylus 39 which writes on electrosensitive paper supported on a drum 40. This drum turns in synchronism with the recording drum 24. A seismic record of conventional appearance is therefore produced by the monitor unit 28. Timing lines may be accurately preprinted on the electrosensitive paper, as is well known in the art.

The correlated signal, after any desirable filtering or A.V.C. action in the amplifier 37, may also be applied to a cross section camera. This camera or recorder is shown generally at 29 and it may be any one of several types known in the art.

In addition to the plurality of seismic information channels derived from the reproducer 20, it is preferred to include an accurate timing track (typically a 100 c.p.s. signal) and a record of the swept frequency signal transmitted to the vibrators. The timing track may be transferred to the correlated tape and the monitor record by means of a relay (not shown) which bypasses the correlator while this track is being reproduced. This relay may be energised by a separate pole (not shown) of the step switch 21.

Another relay, similarly operated, may be used to bypass the filters and A.V.C. components in the amplifier 37 while the swept frequency control signal is being reproduced. This ensures that the resulting autocorrelation pulse (which represents the time zero of the seismic record) is not distorted by these agencies.

It is apparent that the correlated tape made on the recorder 24 may be checked by playing it back through the monitor unit 28. A switch 41 and preamplifier 42 are indicated for this purpose.

The differential 32 may be used to ensure that the zero-time pulse from every field tape mounted on the reproducer drum 20 is recorded at the same place on the correlated tapes made on the drum 24. This may be done by recording on the visual monitor drum 40 a mark which is derived from a microswitch (not shown) on the recording drum 24, and by then adjusting the differential 32 until the zero-time pulse derived from the field tape is coincident with this mark. The differential 32 may also be used for the insertion of static or datum corrections, according to principles well known in the art of seismic prospecting. However, this function is normally served by the time correction unit 30.

The time correction unit 30 operates by moving the correlation head 12 relative to the fixed recording head 10. It will be apparent that this course (in contradistinction to that of moving the recording head) preserves the dimensional correspondence between the pattern of signals on the magnetic tape 4 and the configuration of the correlation head 12. The correlation head 12 may be moved as a whole without disturbing the process of correlation. The movement of the correlation head 12 is effected by a servo motor 43 in conjunction with suitable gearing which is shown generally at 44 (FIGURE 1). The correlation head carrier 15 is slidably mounted so that it may move around its own centre of curvature.

A linear motion potentiometer 45 (FIGURE 1) detects the position of the head carrier 15 and so generates an error signal; this is used as one of the inputs to a standard servo amplifier (not shown), which drives the servo motor 43.

The other input to the servo amplifier is derived from a rotary potentiometer 46 (FIGURE 6) which is attached to the shaft of the recording drum 24. The law or function of this potentiometer can be adjusted (by means of suitably spaced taps connected to adjustable sources of potential) to simulate the desired variation between dynamic correction and time, as is well known in the art.

The potential appearing at the wiper of the rotary potentiometer 46 is further subdivided by a series of fixed potential dividers (not shown). These dividers represent the different horizontal distances from the vibrator to the various geophone stations, and are selected sequentially by a step switch (not shown) operating in synchronism with the step switches 21 and 25.

Variable controls are provided in the time correction unit 30 by which potentials corresponding to adjustable static corrections may also be selected by a similar step switch and applied to one of the inputs of the servo amplifier. In this way the position of the correlation head 12 may be adjusted by the servo motor 43 to provide static and dynamic time corrections in a very flexible manner. The controls representing the average velocity-time relation, the spread-length relation and the static correction relations are all continuously variable.

It is apparent that the apparatus herein described represents an improvement in the art of correlating, correcting and displaying seismic data obtained with continuous energy exploration methods, such as the vibration method. The apparatus is capable of modification and adaptation within the scope of this improvement; in particular it may be adapted to other forms of tape reproducer 20 and recorder 24, while the monitor drum 40 may conveniently be mounted on the same shaft as the recorder 24.

Although this apparatus has been described with particular relation to the vibration type system of exploration, it is generally applicable to all exploration methods which involve the transmission and reception of signals of duration long compared to normal seismic pulse periods. If the transmitted signal is not unique (nor nonrepetitive) the output from the correlating head will in general include one or more subsidiary pulses, in addition to the main pulse which indicates the position of overlay or correspondence. In some applications this is not important; in others the spacing, amplitude and duration of the subsidiary pulses may be determined by autocorrelation, and the main pulse may be used to reduce their amplitude in a manner similar to that described in United States Patent No. 2,450,352.

It is to be noted that this process may be effected, in part at least, by suitable variation in the form of the printed circuit strip; the latter then may not follow the shape of the control signal alone, but may represent the super position of the control signal on to one or more attenuated and time shifted versions of itself. Even when the control signal is in fact nonrepetitive (as in the swept frequency signal often used in vibrator operation), this process may be used to reduce the time duration and oscillatory character of the autocorrelation pulse. This is important in any attempt to extract the maximum geological information from the seismic record.

The apparatus herein described also has other applications in seismic exploration. An example exists where it is desired to crosscorrelate a reflection seismic record with a plot of reflection coefficients in the earth. As is well known, such a plot may be derived from an acoustic impedance log, which, in turn, may be adequately represented by a short interval velocity log. In this case, the seismic reflection trace is used as input to the correlator, while the correlating head can be formed (conveniently by the printed circuit technique) to represent the reflection-coefficient-time relation. This procedure gives useful information on the form of the primary seismic pulse and on the significance of multiple reflections and other undesired signals.

The same technique is applicable to other types of acoustic echo ranging where, in a particular case, the spatial distribution and reflection coefficient of the reflectors is known.

A similar technique allows cross correlation of each trace of a seismic cross section, in turn, with a representative, average, expected or synthetic trace, or with portions of such a trace. This affords a strong method of following a conformable series of reflectors across a region where reflection quality is poor, and gives a novel indication of unconformity where such exists.

In the method and apparatus which have been more particularly described above and shown in the drawings the energy field has been made to represent the received signal and it has been caused to travel past the elongated transducer head so as to generate in the latter an output which represents the correlation of the transmitted and received signals. It would, however, also be possible to use a similar transducer head in a different way, by supplying to it an input corresponding to the received signal. As a result of this the transducer head will produce an energy field having a pattern corresponding to a correlation of the transmitted and received signals and from this energy field an output can be obtained from which the travel time can be determined. One method of doing this would be to cause a magnetic or other record medium to pass through the energy field and past a playback head, in which latter it will generate an output corresponding to the energy field passing the playback head.

We claim:

1. A method of measuring the travel times of a seismic signal, comprising the steps of:
   transmitting a seismic signal of known frequency content through the earth from a first point to a second point;
   providing a magnetic head transducer having a plurality of conducting elements arranged in a configuration which can be equated to the frequency of the seismic signal transmitted;
   recording the seismic signal as received at the second point on a magnetic record;
   passing the magnetic record over the transducer in a relation providing a coaction between the magnetic flux emanating from the magnetic record and the conducting elements of the transducer to generate correlation signals in the transducer; and
   recording the correlated signals generated in the transducer on a time basis relative to the time of transmission of the seismic signal from the first point, whereby the travel times of the seismic signal may be measured.

2. A method of measuring the travel times of a seismic signal, comprising the steps of:
   transmitting a seismic signal of known frequency content through the earth from a first point to a second point;
   providing an elongated magnetic head transducer having a plurality of conducting elements arranged along the length thereof in accordance with the frequency of the seismic signal transmitted;
   recording the seismic signal as received at the second point on a magnetic record;
   passing the magnetic record over the transducer in a relation providing a coaction between the magnetic flux emanating from the magnetic record and the conducting elements of the transducer to generate correlation signals in the transducer; and
   recording the correlated signals generated in the transducer on a time basis relative to the time of transmission of the seismic signal from the first point, whereby the travel times of the seismic signal may be measured.

3. A method of measuring the travel times of a seismic signal, comprising the steps of:
   transmitting a seismic signal of known frequency content through the earth from a first point to a second point;
   providing an elongated magnetic head transducer having a plurality of conducting elements arranged along the length thereof in accordance with the frequency of the seismic signal transmitted;
   recording the seismic signal as received at the second point on a magnetic record at a preset rate;
   passing the magnetic record over the transducer at the same rate in a relation providing a coaction between the magnetic flux emanating from the magnetic record and the conducting elements of the transducer to generate correlation signals in the transducer; and
   recording the correlated signals generated in the transducer on a time basis relative to the time of transmission of the seismic signal from the first point, whereby the travel times of the seismic signal may be measured.

4. A method of measuring the travel times of a seismic signal, comprising the steps of:
   transmitting a seismic signal of known frequency content through the earth from a first point of a second point;
   providing a magnetic head transducer having a plurality of conducting elements arranged in a configuration which can be equated to the frequency of the seismic signal transmitted;
   recording the seismic signal as received at the second point on a magnetic record;
   recording the seismic signal as transmitted on a magnetic record;
   passing the magnetic record of the transmitted signal over the transducer in a relation providing a coaction between the magnetic flux emanating from the magnetic record and the conducting elements of the transducer to generate an auto correlation pulse in the transducer;
   recording the auto correlation pulse produced in the transducer on a visual record on a time basis relative to the start of transmission of the seismic signal;
   passing the magnetic record of the received signal over the transducer in a relation providing a coaction between the magnetic flux emanating from the magnetic record and the conducting elements of the transducer to generate correlation signals in the transducer; and
   recording said correlated signals on said visual record on a time basis relative to the start of the transmission of the seismic signal, whereby the distances on the visual record between the record of said auto correlation pulse and the record of said correlation signals are indicative of the travel times of the seismic signal between the first and second points.

5. A method of measuring the travel times of a seismic signal, comprising the steps of:
   transmitting a seismic signal of known frequency content through the earth from a first point to a second point;
   providing an elongated magnetic head transducer having a plurality of conducting elements arranged along the length thereof in accordance with the frequency of the seismic signal transmitted;
   recording the seismic signal as received at the second point on a magnetic record;
   recording the seismic signal as transmitted on a magnetic record;
   passing the magnetic record of the transmitted signal over the transducer in a relation providing a coaction between the magnetic flux emanating from the magnetic record and the conducting elements of the transducer to generate an auto correlation pulse in the transducer;
   recording the auto correlation pulses produced in the transducer on a visual record on a time basis relative to the start of transmission of the seismic signal;
   passing the magnetic record of the received signal over the transducer in a relation providing a coaction between the magnetic flux emanating from the magnetic record and the conducting elements of the transducer to generate correlation signals in the transducer; and
   recording said correlated signals on said visual record on a time basis relative to the start of the transmission of the seismic signal, whereby the distances on the visual record between the record of said auto correlation pulse and the record of said correlation signals are indicative of the travel times of the seismic signal between the first and second points.

6. A method of measuring the travel times of a seismic signal, comprising the steps of:

transmitting a seismic signal of known frequency content through the earth from a first point to a second point;

providing a magnetic head transducer having a plurality of conducting elements arranged in a configuration which can be equated to the frequency of the seismic signal transmitted;

recording the seismic signal as received at the second point at a preset rate on a magnetic record;

recording the seismic signal as transmitted at the same preset rate on a magnetic record;

passing the magnetic record of the transmitted signal over the transducer at the same preset rate in a relation providing a coaction between the magnetic flux emanating from the magnetic record and the conducting elements of the transducer to generate an auto correlation pulse in the transducer;

recording the auto correlation pulse produced in the transducer on a visual record on a time basis relative to the start of transmission of the seismic signal;

passing the magnetic record of the received signal over the transducer at the same preset rate in a relation providing a coaction between the magnetic flux emanating from the magnetic record and the conducting elements of the transducer to generate correlation signals in the transducer; and recording said correlated signals on said visual record on a time basis relative to the start of the transmission of the seismic signal, whereby the distances on the visual record between the record of said auto correlation pulse and the record of said correlation signals are indicative of the travel times of the seismic signal between the first and the second points.

References Cited by the Examiner

UNITED STATES PATENTS

| | | | |
|---|---|---|---|
| 2,688,124 | 8/1954 | Doty et al. | 340—15.5 |
| 2,712,415 | 7/1955 | Piety | 340—15.5 X |
| 2,794,965 | 6/1957 | Yost | 340—15.5 |
| 2,839,149 | 6/1958 | Piety | 340—15.5 |
| 2,989,726 | 6/1961 | Crawford et al. | 340—15.5 |
| 3,041,578 | 6/1962 | Elliott | 340—15.5 |
| 3,109,156 | 10/1963 | Anderson | 340—15.5 |
| 3,127,508 | 3/1964 | Doty et al. | 340—15.5 X |
| 3,174,142 | 3/1965 | Mallinckrodt | 340—15.5 X |

OTHER REFERENCES

Strauss, Wave Generation and Shaping, McGraw-Hill Book Co., Inc., 1960, pages 12–15 relied on.

BENJAMIN A. BORCHELT, *Primary Examiner.*

CHESTER L. JUSTUS, SAMUEL FEINBERG,
*Examiners.*

V. J. DIPIETRO, R. M. SKOLNIK, *Assistant Examiners.*